United States Patent
Kamiguchi (10) Patent No.: US 11,936,494 B2
(45) Date of Patent: Mar. 19, 2024

(54) IN-VEHICLE COMMUNICATION DEVICE AND INFORMATION REPLACEMENT METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Shogo Kamiguchi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 7 days.

(21) Appl. No.: 17/755,971

(22) PCT Filed: Oct. 27, 2020

(86) PCT No.: PCT/JP2020/040268
§ 371 (c)(1),
(2) Date: May 12, 2022

(87) PCT Pub. No.: WO2021/095551
PCT Pub. Date: May 20, 2021

(65) Prior Publication Data
US 2022/0393903 A1    Dec. 8, 2022

(30) Foreign Application Priority Data

Nov. 13, 2019 (JP) ................................. 2019-205750

(51) Int. Cl.
*H04L 12/40* (2006.01)
*H04L 9/40* (2022.01)
(Continued)

(52) U.S. Cl.
CPC .............. *H04L 12/40* (2013.01); *H04L 12/46* (2013.01); *H04L 63/1425* (2013.01); *H04L 63/1441* (2013.01); *H04L 67/12* (2013.01)

(58) Field of Classification Search
CPC ..... H04L 12/40; H04L 12/46; H04L 63/1425; H04L 63/1441; H04L 67/12;
(Continued)

(56) References Cited

U.S. PATENT DOCUMENTS

2010/0031106 A1*  2/2010  Isoyama ............... H04L 1/0061
                                                            714/E11.023
2019/0031202 A1*  1/2019  Takeda ................ B60T 8/17557
(Continued)

FOREIGN PATENT DOCUMENTS

JP    H6-199154 A      7/1994
JP    2018-182767 A    11/2018

OTHER PUBLICATIONS

International Search Report for Application PCT/JP2020/040268 dated Dec. 28, 2020 (ISA/JPO).

*Primary Examiner* — Kim T Nguyen
(74) *Attorney, Agent, or Firm* — Honigman LLP (57) ABSTRACT

An in-vehicle communication device includes: an abnormality detection unit detecting abnormalities in in messages received by a reception unit receiving messages from one or more other devices; an estimation unit estimating normal information corresponding to information in which abnormalities have been detected; and a replacement unit replacing information included in messages received by the reception unit with information estimated by the estimation unit. The in-vehicle communication device may include: a first determination unit that determines whether messages received by the reception unit are periodic or non-periodic messages; and a second determination unit that, for a message determined as being periodic by the first determination (Continued)

unit, determines whether or not the periodic message has been transmitted at a predetermined cycle, and the abnormality detection unit may detect abnormalities in information included in periodic messages determined as having been transmitted at predetermined cycles by the second determination unit.

7 Claims, 6 Drawing Sheets

(51) Int. Cl.
*H04L 12/46* (2006.01)
*H04L 67/12* (2022.01)

(58) Field of Classification Search
CPC .......... H04L 2012/40215; H04L 2012/40273; H04W 4/48
See application file for complete search history.

(56) References Cited

U.S. PATENT DOCUMENTS

2020/0014758 A1\* 1/2020 Kamiguchi ........... B60W 50/04
2021/0092025 A1\* 3/2021 Ukai ................. H04L 12/40143

\* cited by examiner

Abnormality detection table

| ID | Periodic/non-periodic | Cycle | Normal range | Normal increase/decrease amount |
|---|---|---|---|---|
| 10 | Periodic | 100 Msec | 10～70 | ±10 |
| 20 | Periodic | 70 Msec | 3～20 | — |
| 30 | Periodic | 200 Msec | — | +10、-5 |
| 40 | Non-periodic | — | 0～20 | — |
| 50 | Non-periodic | — | 0／1 | — |

FIG. 4

Information estimation table

| ID | Estimation method |
|---|---|
| 10 | Average value of past three times |
| 20 | Increase/decrease by average value of increase/decrease amounts in past five times |
| 30 | Specific value |
| 40 | Calculate based on brightness outside vehicle |
| 50 | 0 if vehicle speed ≥ 5 km/h, 1 if vehicle speed < 5 km/h |

IN-VEHICLE COMMUNICATION DEVICE AND INFORMATION REPLACEMENT METHOD

CROSS-REFERENCE TO RELATED APPLICATIONS

This application is the U.S. national stage of PCT/JP2020/040268 filed on Oct. 27, 2020, which claims priority of Japanese Patent Application No. JP 2019-205750 filed on Nov. 13, 2019, the contents of which are incorporated herein.

TECHNICAL FIELD

The present disclosure relates to an in-vehicle communication device for transmitting/receiving a message to/from another device installed in a vehicle, and an information replacement method for replacing information included in the message.

BACKGROUND

Conventionally, a plurality of devices such as electronic control units (ECUs) are installed in a vehicle. These in-vehicle devices are connected to each other via communication lines, exchange information by transmitting/receiving messages, and work together to realize various functions of the vehicle. For in-vehicle communication, communication standards such as Controller Area Network (CAN) and Ethernet (registered trademark) are widely adopted.

JP 2018-182767A proposes a network device that can take defensive action if a network is subjected to a spoofing attack, by performing authentication based on message authentication information included in a message and invalidating the message if the authentication fails.

Network spoofing attacks include a type of attack in which an abnormal message is inserted between instances of transmission/reception of normal messages, and a type of attack in which a normal message is overwritten with an abnormal message. If invalidation such as that performed by the network device disclosed in JP 2018-182767A is performed in response to an attack in which a normal message is overwritten with an abnormal message, a message that is supposed to be transmitted periodically will be lost, for example.

The present disclosure has been made in view of such circumstances, and aims to propose an in-vehicle communication device and an information replacement method with which mitigation of adverse effects due to network attacks can be expected.

SUMMARY

An in-vehicle communication device according to the present aspect is an in-vehicle communication device installed in a vehicle, the in-vehicle communication device including a reception unit and a processing unit, wherein the reception unit receives messages from one or more other devices, and the processing unit: detects abnormalities in information included in messages received by the reception unit; estimates normal information corresponding to information in which abnormalities have been detected; and replaces information included in messages received by the reception unit with estimated information.

Not only can the present application be realized as a device such as an in-vehicle communication device including such a characteristic processing unit, but the present application can also be realized as an information replacement method including such characteristic processing as steps or as a computer program for causing a computer to execute such steps. The present application can also be realized as one or more semiconductor integrated circuits that realize a part of or the entirety of such devices, or as another device or system including such devices.

Advantageous Effects of Invention

According to the above, mitigation of adverse effects due to network attacks can be expected.

DETAILED DESCRIPTION OF PREFERRED EMBODIMENTS

First, aspects of embodiment of the present disclosure will be listed and described. The embodiments described below may at least be partially combined as appropriate.

First Aspect

An in-vehicle communication device according to the present aspect is an in-vehicle communication device installed in a vehicle, the in-vehicle communication device including a reception unit and a processing unit, wherein the reception unit receives messages from one or more other devices, and the processing unit: detects abnormalities in information included in messages received by the reception unit; estimates normal information corresponding to information in which abnormalities have been detected; and replaces information included in messages received by the reception unit with estimated information.

In the first aspect, if the in-vehicle communication device detects an abnormality in information included in a message received from another device, the in-vehicle communication device estimates normal information corresponding to the abnormal information, and replaces the abnormal information included in the received message with the estimated information. Thus, it can be expected that, even if a spoofing attack occurs in which a legitimate message is overwritten, the risk of subsequent processing being affected by the loss of the message due to the spoofing attack can be mitigated because normal information that was most likely included in the original message can be estimated and used in subsequent processing.

Second Aspect

In a second aspect, preferably, the processing unit: determines whether messages received by the reception unit are periodic messages that are periodically transmitted or non-periodic messages that are not periodically transmitted; for a message determined as being a periodic message, determines whether or not the periodic message has been transmitted at a predetermined cycle; and detects abnormalities in information included in periodic messages determined as having been transmitted at predetermined cycles.

In the second aspect, the in-vehicle communication device determines whether received messages are periodic messages or non-periodic messages, and furthermore, for a periodic message, the in-vehicle communication device determines whether or not the periodic message has been transmitted at a correct, predetermined cycle. The in-vehicle communication device detects abnormalities in periodic messages transmitted at correct cycles. Thus, the in-vehicle communication device can deal with a spoofing attack in which a periodic message transmitted at a correct cycle is overwritten.

Third Aspect

In a third aspect, preferably, the processing unit estimates normal information for a periodic message in which an abnormality has been detected, based on a chronological change in information included in a plurality of periodic messages received prior to the periodic message in which an abnormality has been detected.

In the third aspect, normal information corresponding to information in which an abnormality has been detected is estimated based on a chronological change in information included in a plurality of periodic messages received prior to a periodic message in which the abnormality has been detected. Thus, in regard to information included in periodic messages, the latest information can be estimated based on previous changes.

Fourth Aspect

In a fourth aspect, preferably, the processing unit discards periodic messages determined as not having been transmitted at predetermined cycles.

In the fourth aspect, the in-vehicle communication device discards periodic messages that are not transmitted at correct cycles. Thus, a spoofing attack in which an abnormal message is transmitted between instances of transmission of normal periodic messages can be dealt with.

Fifth Aspect

In the fifth aspect, preferably, the processing unit detects abnormalities in information included in non-periodic messages.

In the fifth aspect, the in-vehicle communication device detects abnormalities in information included in non-periodic messages. Thus, the in-vehicle communication device can deal with a spoofing attack involving a non-periodic message.

Sixth Aspect

In the sixth aspect, preferably, the processing unit estimates normal information for a non-periodic message in which an abnormality has been detected, based on information included in a periodic message received prior to the non-periodic message in which an abnormality has been detected.

In the sixth aspect, normal information corresponding to information in a non-periodic message in which an abnormality has been detected is estimated based on information included in a periodic message received prior to the non-periodic message in which an abnormality has been detected. Thus, normal information for a non-periodic message can be estimated in accordance with the state of the vehicle, etc., that can be determined based on information in a periodic message.

Seventh Aspect

In the seventh aspect, a transmission unit is included, the processing unit provides, to a message in which information has been replaced, flag information indicating that the replacement has been performed, and the transmission unit transmits, to one or more other devices, messages in which no abnormality in information has been detected by the processing unit and messages in which information has been replaced by the processing unit.

In the seventh aspect, the in-vehicle communication device relays messages between a plurality of devices. In doing so, if the in-vehicle communication device detects an abnormality in a message to be relayed, the in-vehicle communication device relays the message after the above-described estimation and replacement have been performed. If the in-vehicle communication device replaces information, the in-vehicle communication device notifies a relay-destination device of the fact that the replacement has been performed by providing, to the message, flag information indicating that the replacement has been performed. Thus, the relay-destination device can determine, based on the flag information provided to the message, whether or not information has been replaced, and can perform processing such as discarding if the replaced information is of low necessity, for example.

Eighth Aspect

In an information replacement method according to the eighth aspect, an in-vehicle communication device installed in a vehicle: detects abnormalities in information included in messages received from one or more other devices; estimates normal information corresponding to information in which abnormalities have been detected; and replaces information included in received messages with estimated information.

In the eighth aspect, as in the first aspect, it can be expected that the risk of subsequent processing being affected by the loss of a message due to a spoofing attack can be mitigated.

A specific example of an in-vehicle communication system according to an embodiment of the present disclosure will be described in the following with reference to the drawings. The present disclosure is not limited to these examples, and is intended to include all modifications that are indicated by the claims and are within the meaning and scope of equivalents of the claims.

System Configuration

Figure 1:
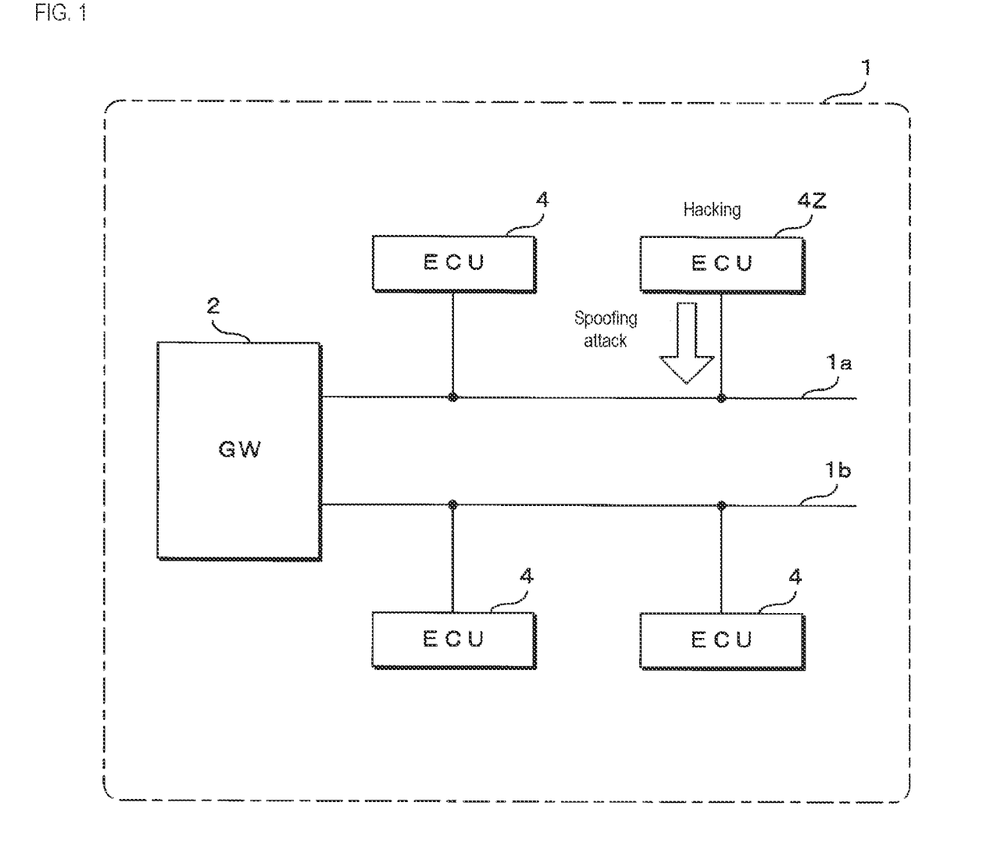
FIG. 1 is a schematic diagram illustrating a configuration of an in-vehicle communication system according to the present embodiment.

FIG. 1 is a schematic diagram illustrating a configuration of the in-vehicle communication system according to the present embodiment. The in-vehicle communication system according to the present embodiment is a system in which a gateway (GW) 2 and a plurality of ECUs 4 installed in a vehicle 1 communicate via communication lines 1a and 1b. In the illustrated example, two bus-type communication lines 1a and 1b are provided in the vehicle 1. The GW 2 and two ECUs 4 are connected to a first communication line 1a, and the GW 2 and two ECUs 4 are connected to a second communication line 1b. The GW 2 has both the two communication lines 1a and 1b connected thereto, and performs processing for relaying communication between the two communication lines 1a and 1b. The four ECUs 4 can thus communicate via the GW 2 and the communication lines 1a and 1b.

For example, in a case in which one ECU 4 included in the in-vehicle communication system is hacked by the insertion of a malicious program, etc. (in FIG. 1, the hacked ECU 4 is illustrated as ECU 4Z), the ECU 4Z may transmit abnormal messages on the communication line 1a constituting the network in the vehicle 1. The in-vehicle communication system according to the present embodiment detects the transmission of such abnormal messages, and replaces information included in the abnormal messages with normal information.

The replacement of information in abnormal messages may be performed by the GW 2 or by each ECU 4. In the present embodiment, a description will be provided in which the GW 2 replaces information. The GW 2 according to the present embodiment relays messages between the communication lines 1a and 1b by transmitting a message received from one of the communication lines 1a and 1b from the other one of the communication lines 1a and 1b. If the GW 2 determines that information included in a received message is abnormal, the GW 2 estimates normal information corresponding to the abnormal information and relays a message in which the abnormal information has been replaced with the estimated information. Furthermore, flag information indicating whether or not information has been replaced is provided to messages relayed by the GW 2 according to the present embodiment.

Figure 2:
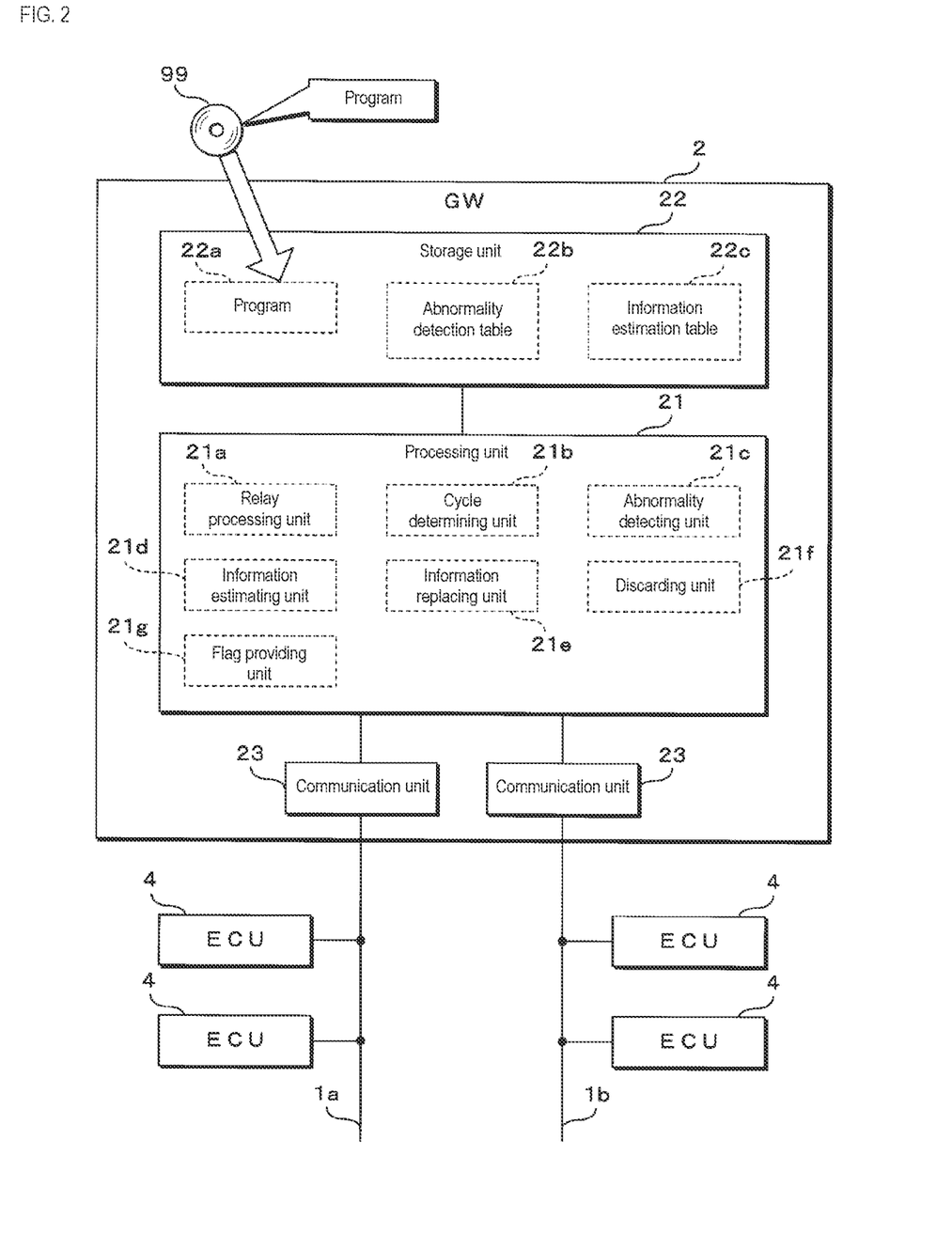
FIG. 2 is a block diagram illustrating a configuration of a GW according to the present embodiment.

FIG. 2 is a block diagram illustrating a configuration of the GW 2 according to the present embodiment. The GW 2 according to the present embodiment is configured to include a processing unit (processor) 21, a storage unit (storage) 22, two communication units (transceivers) 23, etc. The processing unit 21 is configured using a computational processing device such as a central processing unit (CPU) or a micro-processing unit (MPU), for example. The processing unit 21 can perform various types of processing by reading and executing programs stored in the storage unit 22. In the present embodiment, the processing unit 21 reads and executes a program 22a stored in the storage unit 22, and thereby performs various types of processing, such as processing for relaying messages between the communication lines 1a and 1b and processing for replacing information included in abnormal messages.

The storage unit 22 is configured using a non-volatile memory element such as a flash memory or an electrically erasable programmable read only memory (EEPROM), for example. The storage unit 22 stores various programs that are executed by the processing unit 21, and various types of data necessary for the processing performed by the processing unit 21. In the present embodiment, the storage unit 22 stores the program 22a executed by the processing unit 21, an abnormality detection table 22b for detecting abnormalities in information included in messages, and an information estimation table 22c for estimating normal information corresponding to abnormal information. The abnormality detection table 22b and the information estimation table 22c will be described in detail later.

Note that the program 22a may be written to the storage unit 22 in the manufacturing stage of the GW 2, for example. Also, the program 22a may be distributed by a remote server device or the like, and the GW 2 may acquire the distributed program 22a via communication, for example. Alternatively, the program may be recorded on a recording medium 99 such as a memory card or an optical disc for example, and the GW 2 may read the program from the recording medium 99 and store the program to the storage unit 22, for example. Furthermore, the program recorded on the recording medium 99 may be read by a writing device, and the writing device may write the program to the storage unit 22 of the GW 2, for example. The program 22a may be provided so as to be distributed via a network, or may be provided so as to be recorded on the recording medium 99.

The two communication units 23 each have the communication line 1a or 1b connected thereto, and perform communication with the ECUs 4 via the communication lines 1a and 1b. In the present embodiment, the communication units 23 perform message transmission and reception that conforms to the Controller Area Network (CAN) communication standard, for example. The communication units 23 can be configured using a CAN controller IC, for example. Note that the communication standard to be adopted by the communication units 23 is not limited to CAN, and the communication units 23 may perform communication using a communication standard other than CAN, such as Ethernet (registered trademark), for example. The communication units 23 perform message transmission by outputting messages received from the processing unit 21 as electric signals to the communication lines 1a and 1b. Also, the communication units 23 convert electric signals on the communication lines 1a and 1b into digital data by sampling and acquiring electric potentials on the communication lines 1a and 1b, and provide the converted data to the processing unit 21 as received messages.

Furthermore, in the GW 2 according to the present embodiment, a relay processing unit 21a, a cycle determining unit 21b, an abnormality detecting unit 21c, an information estimating unit 21d, an information replacing unit 21e, a discarding unit 21f, a flag providing unit 21g, etc., are realized as software-like functional units in the processing unit 21 as a result of the processing unit 21 reading and executing the program 22a stored in the storage unit 22. The relay processing unit 21a performs processing for relaying messages between the communication lines 1a and 1b by transmitting a message received by one of the two communication units 23 from the other one of the communication units 23.

The cycle determining unit 21b performs determination processing relating to the cycles of messages received by the communication units 23. The cycle determining unit 21b determines whether received messages are periodic messages that are transmitted periodically or non-periodic messages (so-called event messages) that are not transmitted periodically. Furthermore, for a periodic message, the cycle determining unit 21b determines whether a periodic message has been transmitted at the correct cycle set for each periodic message. The cycle determining unit 21b performs the determination based on information in the abnormality detection table 22b stored in the storage unit 22.

The abnormality detecting unit 21c performs processing for detecting abnormalities in information included in messages received by the communication units 23. The abnormality detecting unit 21c detects abnormalities in periodic messages determined by the cycle determining unit 21b as having been transmitted at the correct cycles and non-periodic messages determined by the cycle determining unit 21b. The abnormality detecting unit 21c determines whether a received message is normal or abnormal by referring to the abnormality detection table 22b stored in the storage unit 22 and determining whether or not information included in the received message satisfies conditions defined in the abnormality detection table 22b.

The information estimating unit 21d performs, for a message in which an abnormality has been detected by the abnormality detecting unit 21c, processing for estimating normal information corresponding to the abnormal information included in the message. The information estimating unit 21d estimates information based on methods defined in the information estimation table 22c stored in the storage unit 22.

The information replacing unit 21e performs processing for replacing abnormal information included in a message in which an abnormality has been detected by the abnormality detecting unit 21c with normal information estimated by the information estimating unit 21d.

The discarding unit 21f performs processing for discarding, as spoofing attack messages, periodic messages determined by the cycle determining unit 21b as not having been transmitted at the correct cycles. For example, the discarding unit 21f prohibits the relay processing unit 21a from performing relay processing so that a spoofing attack message received by one of the communication units 23 is not transmitted from the other one of the communication units 23, and thereby causes the message to be discarded. Furthermore, the discarding unit 21f may transmit, from the communication unit 23 that received a spoofing attack message, a message including a command to discard the spoofing attack message, and may thereby cause the ECU 4 receiving this message to discard the spoofing attack message.

The flag providing unit 21g performs processing for providing, to messages relayed by the relay processing unit 21a, flag information indicating whether or not information has been replaced by the information replacing unit 21e. In the present embodiment, the messages transmitted and received by the GW 2 and the ECUs 4 conform to the CAN communication standard. For example, a data frame, which is one type of CAN message, includes an arbitration field, a control field, a data field, a cyclic redundancy check (CRC) field, an ACK field, etc. A message ID is stored in the arbitration field, and a sensor detection value, a device control value, or the like is stored in the data field, for example. The information handled by the information estimating unit 21d, the information replacing unit 21e, etc., described above is the information stored in this data field. In the present embodiment, a partial area (one to several bits) of the data field is used to store the flag information, and the flag providing unit 21g stores the value "1" to this area if information has been replaced and stores the value "0" to this area if information has not been replaced, for example. Note that, in a case in which a communication standard other than the CAN communication standard is adopted, it suffices to use an appropriate area in a message as an area for storing the flag information in a similar manner.

Information Replacement Processing

Figure 3:
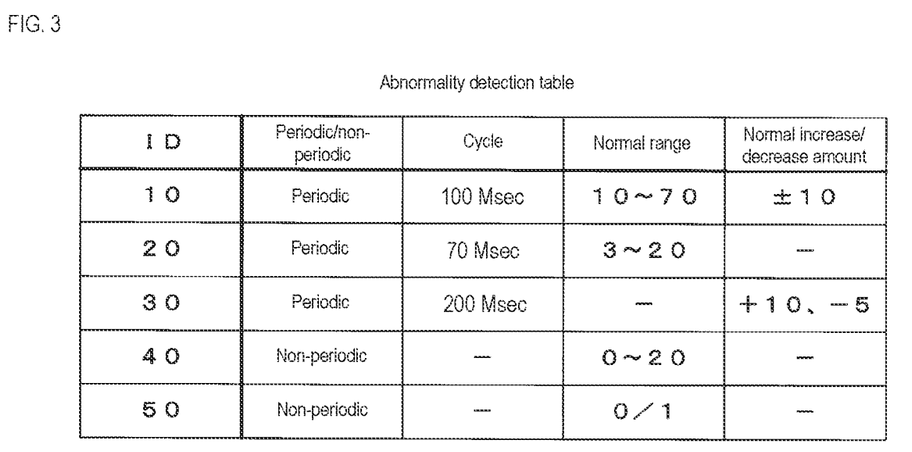
FIG. 3 is a schematic diagram illustrating one example configuration of an abnormality detection table that is included in the GW according to the present embodiment.

Next, the information replacement processing performed by the GW 2 according to the present embodiment will be described. FIG. 3 is a schematic diagram illustrating one example configuration of the abnormality detection table 22b that is included in the GW 2 according to the present embodiment. The abnormality detection table 22b according to the present embodiment stores the following information in association with an ID given to a message: information indicating whether the message is a periodic message or a non-periodic message; a transmission cycle, if the message is a periodic message; a normal range of the information included in the message; a normal increase/decrease amount of the information included in the message; etc. Note that, in the present embodiment, the GW 2 stores, at least for periodic messages, received information (information included in the messages, reception times, etc.) regarding several past received messages.

In the illustrated example, a message with the ID 10 is a periodic message, and the transmission cycle of the message is 100 msec. Furthermore, the normal range and the normal increase/decrease amount of the value of the information included in this periodic message is 10-70 and ±10, respectively. If the ID of a received message is 10, the cycle determining unit 21b of the GW 2 determines that the message is a periodic message and obtains 100 msec as the transmission cycle of the message by referring to the abnormality detection table 22b. The cycle determining unit 21b calculates the time that has elapsed from the timing when a periodic message with the ID 10 was previously received to the current reception timing, or in other words, calculates the transmission cycle. The cycle determining unit 21b determines whether or not the calculated transmission cycle matches the transmission cycle set in the abnormality detection table 22b. Here, however, the cycle determining unit 21b tolerates a predetermined error (for example, ±10%) from the set transmission cycle, and determines whether or not the transmission cycle calculated based on the actual reception timings is within the range of 100 msec ±10% (that is, the range of 90-110 msec).

The abnormality detecting unit 21c, based on the normal ranges and the normal increase/decrease amounts set in the abnormality detection table 22b, detects abnormalities in periodic messages determined by the cycle determining unit 21b as having been transmitted at the correct transmission cycles and messages determined by the cycle determining unit 21b as being non-periodic messages. The abnormality detecting unit 21c acquires information (information included in the data field in the case of the CAN communication standard) included in an abnormality detection target message. The abnormality detecting unit 21c determines whether or not the value of the information acquired from the message is within the normal range set in the abnormality detection table 22b. In the illustrated example, the normal range for a periodic message with the ID 10 is set to 10-70, and the abnormality detecting unit 21c determines that the message is a normal message if the value of the information acquired from the message is within the range of 10-70.

Furthermore, in the case of a periodic message for which a normal increase/decrease amount is set in the abnormality detection table 22b, the abnormality detecting unit 21c calculates the increase/decrease amount of the information in the current message from the information in the previously received message. The abnormality detecting unit 21c determines whether or not the calculated information increase/decrease amount is within the normal increase/decrease amount range set in the abnormality detection table 22b. In the illustrated example, the normal increase/decrease amount for a periodic message with the ID 10 is set to ±10, and, in a case in which the previous value was 50 for example, the abnormality detecting unit 21c determines that the message is a normal message if the current value is within the range of 40-60.

Note that, in the abnormality detection table 22b, it is not always necessary for both a normal range and a normal increase/decrease amount to be set, and only one of a normal range and a normal increase/decrease amount may be set. If both a normal range and a normal increase/decrease amount are set, the abnormality detecting unit 21c determines a message that satisfies both conditions as a normal message and determines a message that does not satisfy at least one of the conditions as an abnormal message. However, the method that the abnormality detecting unit 21c uses to detect abnormalities is not limited to the above-described method based on a normal range and a normal increase/decrease amount, and methods other than this may be adopted.

Figure 4:
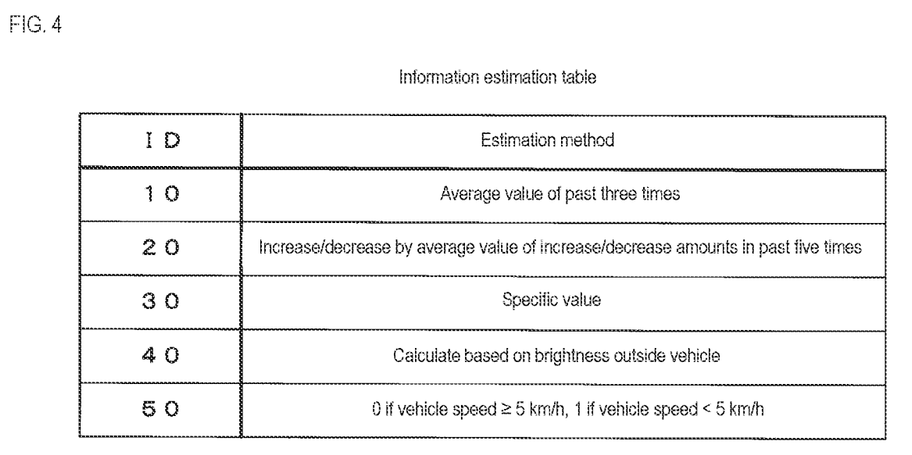
FIG. 4 is a schematic diagram illustrating one example configuration of an information estimation table that is included in the GW according to the present embodiment.

FIG. 4 is a schematic diagram illustrating one example configuration of the information estimation table 22c that is included in the GW 2 according to the present embodiment. The information estimation table 22c according to the present embodiment stores an information estimation method in association with an ID given to a message. Note that, in the present example, messages with the IDs 10, 20, and 30 are periodic messages, and messages with the IDs 40 and 50 are non-periodic messages.

In the illustrated example, for a message with the ID 10, a setting is made such that an average value of information corresponding to the past three messages with the ID 10 is to be used as an estimated value. In a case in which the information estimating unit 21d estimates information in a message with the ID 10 in which an abnormality has been detected, the information estimating unit 21d acquires information corresponding to the last three messages with the ID 10, calculates an average value of such information, and sets the calculated average value as an estimated value. The information replacing unit 21e replaces, with this estimated value, the information (i.e., the value in the data field) in the message in which an abnormality has been detected.

Furthermore, in the illustrated example, for a message with the ID 20, a setting is made such that an estimated value is to be calculated by increasing/decreasing the value of information by an average value of the increase/decrease amounts in the past five messages with the ID 20. In a case in which the information estimating unit 21d estimates information in a message with the ID 20 in which an abnormality has been detected, the information estimating unit 21d acquires information corresponding to the last five messages with the ID 20, and calculates the amount by which the information increased/decreased each time. The information estimating unit 21d can calculate four increase/decrease amounts from the information corresponding to the past five messages with the ID 20, and calculates an average value of the four calculated increase/decrease amounts. The information estimating unit 21d sets, as an estimated value, a value obtained by increasing/decreasing the previous value of the information by the calculated average value of increase/decrease amounts. The information replacing unit 21e replaces, with this estimated value, the information in the message in which an abnormality has been detected.

Furthermore, in the illustrated example, for a message with the ID 30, a setting is made such that a specific value is to be set as an estimated value. In this case, the information estimating unit 21d sets a preset specific value as an estimated value of information in a message with the ID 30 in which an abnormality has been detected. The information replacing unit 21e replaces, with this estimated value (specific value), the information in the message in which an abnormality has been detected.

Furthermore, in the illustrated example, for a non-periodic message with the ID 40, a setting is made such that calculation is to be performed based on the brightness outside the vehicle. In the present embodiment, information in a non-periodic message is estimated based on information in a related periodic message received prior to the non-periodic message. In the present example, a sensor for sensing the brightness outside the vehicle is installed in the vehicle 1, and information regarding the brightness sensed by this sensor is transmitted and received as periodic messages. In a case in which the information estimating unit 21d estimates information in a non-periodic message with the ID 40 in which an abnormality has been detected, the information estimating unit 21d acquires brightness information from a periodic message received prior to this non-periodic message, and estimates the information in the non-periodic message based on the acquired brightness using a predetermined calculation formula. The information replacing unit 21e replaces, with this estimated value, the information in the non-periodic message in which an abnormality has been detected. For example, information in non-periodic messages relating to events such as the turning on/off of lights of the vehicle 1 and the adjustment of the light intensity of the lights of the vehicle 1 can be estimated based on the brightness outside the vehicle.

Furthermore, in the illustrated example, for a non-periodic message with the ID 50, a setting is made such that calculation is to be performed based on the vehicle speed of the vehicle 1. In the present example, information regarding the vehicle speed of the vehicle 1 is transmitted and received as periodic messages. In a case in which the information estimating unit 21d estimates information in a non-periodic message with the ID 50 in which an abnormality has been detected, the information estimating unit 21d acquires vehicle-speed information from a periodic message received prior to this non-periodic message, and sets 0 as an estimated value if the acquired vehicle speed is 5 km/h or more and sets 1 as an estimated value if the acquired vehicle speed is less than 5 km/h. The information replacing unit 21e replaces, with this estimated value, the information in the non-periodic message in which an abnormality has been detected. For example, information in non-periodic messages relating to events such as the opening/closing of doors of the vehicle 1 and locking/unlocking of the doors can be estimated from the vehicle speed.

Note that the information in the abnormality detection table 22b and the information estimation table 22c provided in the GW 2 according to the present embodiment is determined in advance and stored to the storage unit 22 of the GW 2 in the design stage, manufacturing stage, etc., of the in-vehicle communication system, the GW 2, the ECUs 4, etc., for example. Furthermore, the information in the abnormality detection table 22b and the information estimation table 22c may be updated at an appropriate timing after the vehicle 1 has been manufactured.

Figure 5:
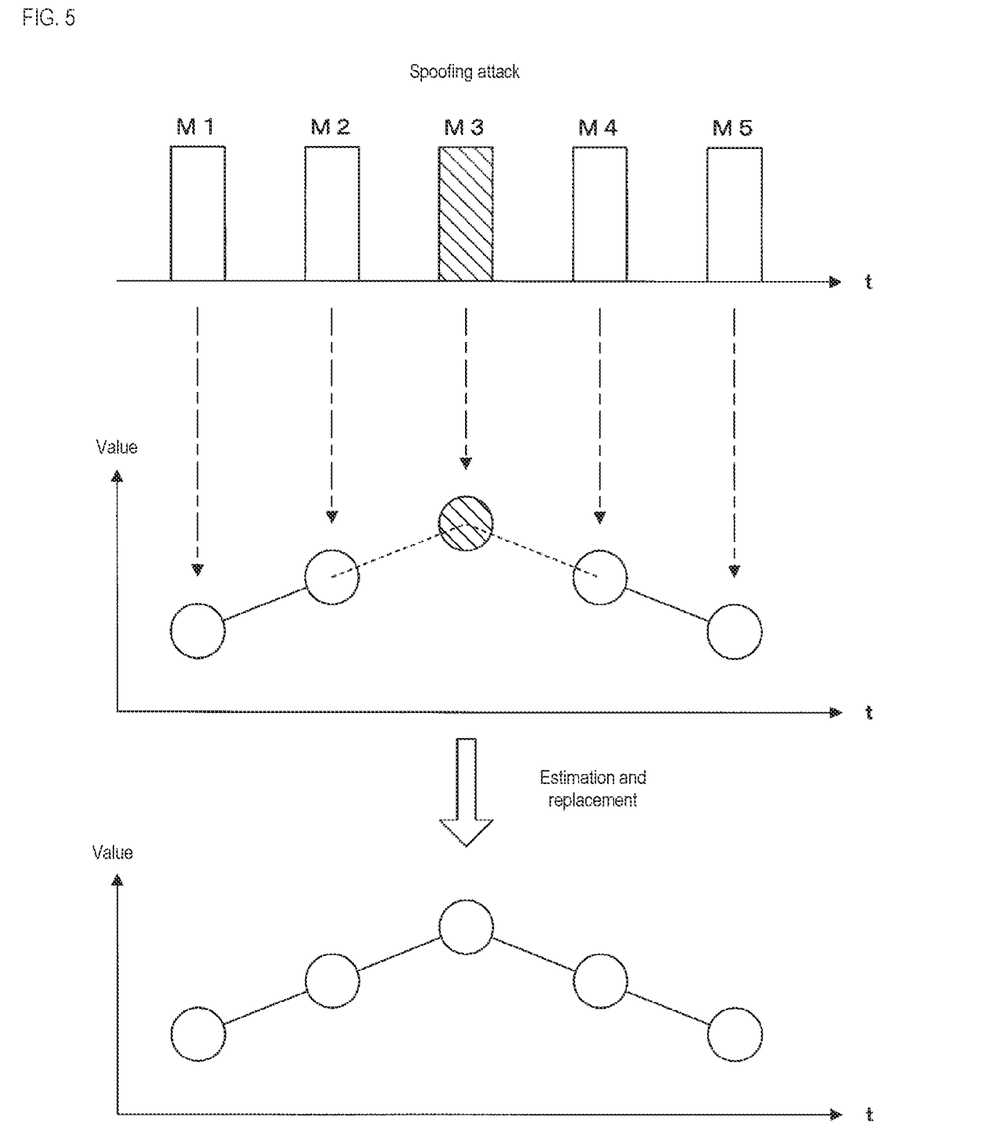
FIG. 5 is a schematic diagram illustrating one example of estimation and replacement of information performed by the GW according to the present embodiment.

FIG. 5 is a schematic diagram illustrating one example of the estimation and replacement of information performed by the GW 2 according to the present embodiment. A timing chart indicating transmission timings of periodic messages M1 to M5 is illustrated in the upper part of FIG. 5. Furthermore, in FIG. 5, a graph indicating a state of loss of information due to a spoofing attack is illustrated in the middle part, and a graph indicating a state in which the lost information has been estimated and replaced is illustrated in the lower part.

In the illustrated example, periodic messages are transmitted in the order of M1, M2, M3, M4, and M5, and of these periodic messages, the third periodic message M3 has been tampered with due to a spoofing attack. In devices such as the GW 2 and the ECU 4 receiving this periodic message M3, the periodic message M3 is detected as being an abnormal message, and the information included in the periodic message M3 cannot be used for processing such as control, resulting in a loss of periodically acquired information.

For the periodic message M3, in which an abnormality has been detected, the GW 2 according to the present embodiment estimates the normal information that would have been included if the tampering due to the spoofing attack had not occurred, and also replaces the information in the periodic message M3, in which an abnormality has been detected, with the estimated information. In the illustrated example, the GW 2 estimates the information in the periodic message M3, in which an abnormality has been detected, by calculating the information increase/decrease amount from the periodic message M1 to the periodic message M2 received prior to the periodic message M3 and by applying the calculated increase/decrease amount to the information in the periodic message M2. The GW 2 replaces the information in the periodic message M3, in which an abnormality has been detected, with the estimated value, and relays the periodic message M3 after the replacement has been performed.

Figure 6:
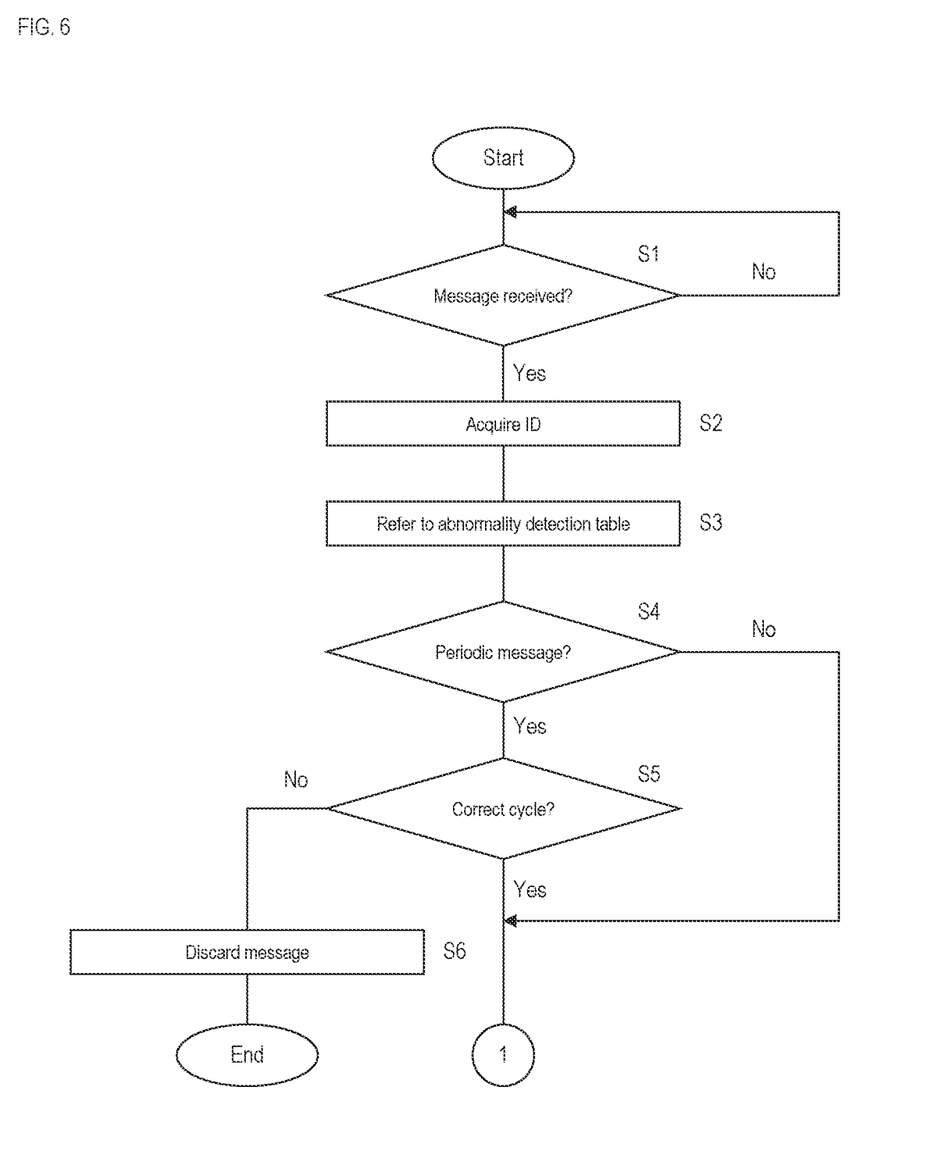
FIG. 6 is a flowchart illustrating one example of procedures of processing performed by the GW according to the present embodiment.
Figure 7:
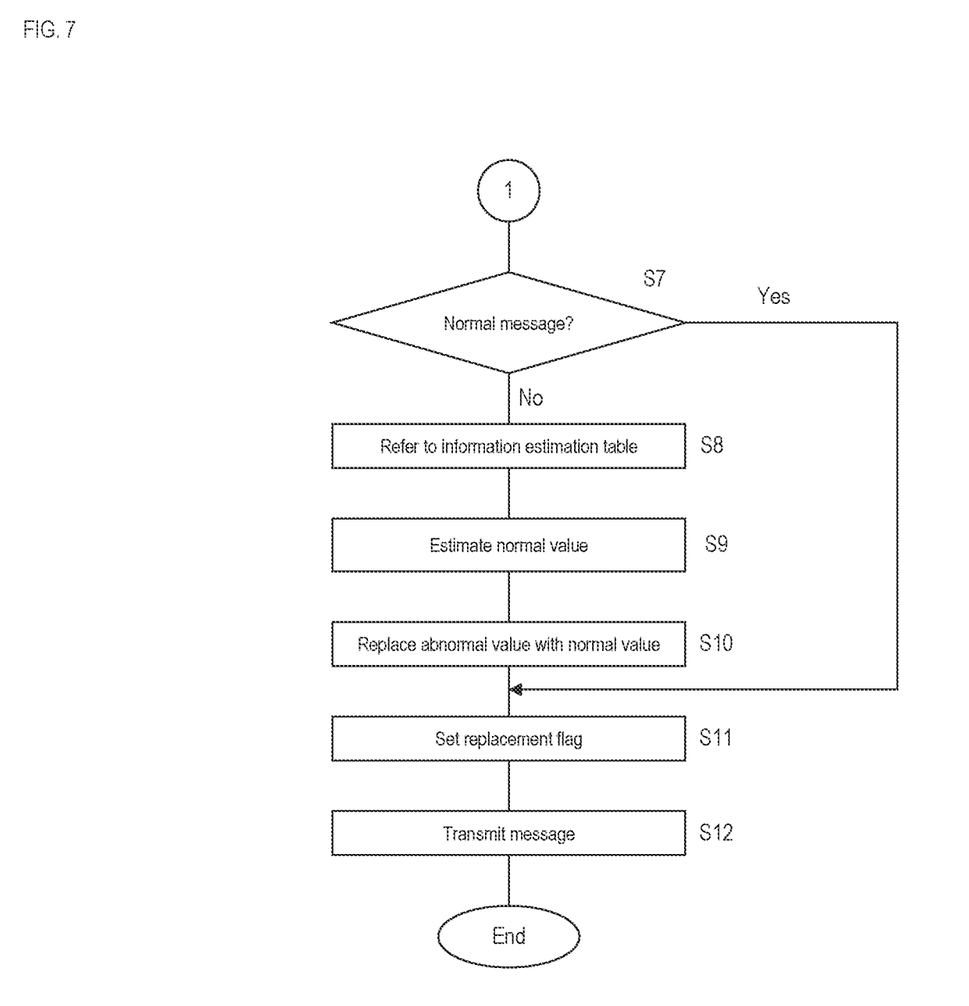
FIG. 7 is a flowchart illustrating one example of procedures of the processing performed by the GW according to the present embodiment.

FIGS. 6 and 7 are flowcharts illustrating one example of procedures of the processing performed by the GW 2 according to the present embodiment. The relay processing unit 21a in the processing unit 21 of the GW 2 according to the present embodiment determines whether or not a message from an ECU 4 has been received by one of the communication units 23 (step S1). If no message has been received (S1: NO), the relay processing unit 21a waits until a message is received.

If a message has been received (S1: YES), the cycle determining unit 21b in the processing unit 21 acquires the ID included in the received message (step S2). Based on the ID acquired in step S2, the cycle determining unit 21b refers to the abnormality detection table 22b stored in the storage unit 22 (step S3). Based on the information stored in the abnormality detection table 22b indicating whether messages are periodic messages or non-periodic messages, the cycle determining unit 21b determines whether or not the received message is a periodic message (step S4). If the received message is not a periodic message (S4: NO), or in other words, if the received message is a non-periodic message, the cycle determining unit 21b proceeds to the processing in step S7.

If the received message is a periodic message (S4: YES), the cycle determining unit 21b determines whether or not the received periodic message has been transmitted at the correct cycle by calculating the transmission cycle from the difference between the timing when a message with the same ID was previously received and the current reception timing and comparing the transmission cycle with the cycle stored in the abnormality detection table 22b (step S5). If the message has not been transmitted at the correct cycle (S5: NO), the discarding unit 21f in the processing unit 21 performs processing for discarding the received message (step S6), and terminates processing. If the message has been transmitted at the correct cycle (S5: YES), the cycle determining unit 21b proceeds to the processing in step S7.

If the received message is a non-periodic message or a periodic message transmitted at the correct cycle, the abnormality detecting unit 21c in the processing unit 21 determines whether or not the received message is a normal message by comparing the information included in the message and the normal range and normal increase/decrease amount set in the abnormality detection table 22b (step S7). If the received message is a normal message (S7: YES), the abnormality detecting unit 21c proceeds to the processing in step S11.

If the received message is not a normal message (S7: NO), or in other words, if the received message is an abnormal message, the information estimating unit 21d in the processing unit 21 refers to the information estimation table 22c stored in the storage unit 22 (step S8). Using the estimation method stored in the information estimation table 22c, the information estimating unit 21d estimates a normal value corresponding to the abnormal value of the information included in the message determined as being abnormal (step S9). The information replacing unit 21e in the processing unit 21 replaces the abnormal value included in the abnormal message with the normal value estimated in step S9 (step S10).

The flag providing unit 21g in the processing unit 21, based on whether or not estimation and replacement of information have been performed for the message to be relayed, sets flag information regarding the replacement included in the message to be relayed (step S11). The relay processing unit 21a relays the message in which the flag information has been set by transmitting the message from a communication unit 23 (step S12), and terminates processing.

Conclusion

If the GW 2 according to the present embodiment having the above-described configuration detects an abnormality in information included in a message received from an ECU 4, the GW 2 performs processing for estimating normal information corresponding to the abnormal information and replacing the abnormal information included in the received message with the estimated information. Thus, it can be expected that, even if a spoofing attack in which a legitimate message is overwritten occurs, the risk of subsequent processing being affected by the loss of the message due to the spoofing attack can be mitigated because the GW 2 can estimate and use normal information that was most likely included in the original message in subsequent processing.

Furthermore, the GW 2 according to the present embodiment determines whether received messages are periodic messages or non-periodic messages, and furthermore, for a periodic message, the GW 2 determines whether or not the periodic message has been transmitted at a correct cycle. The GW 2 detects abnormalities in periodic messages transmitted at correct cycles. Thus, the GW 2 can deal with a spoofing attack in which a periodic message transmitted at a correct cycle is overwritten.

The GW 2 according to the present embodiment estimates normal information corresponding to information included in a periodic message in which an abnormality has been detected, based on a chronological change, such as the amount of increase/decrease for example, in information included in a plurality of periodic messages received prior to the periodic message in which the abnormality has been detected. Thus, in regard to information included in periodic messages, the GW 2 can estimate the latest information based on previous changes in the information.

Furthermore, the GW 2 according to the present embodiment discards periodic messages that are not transmitted at the correct cycles. Thus, the GW 2 can deal with a spoofing attack in which an abnormal message is transmitted between instances of transmission of normal periodic messages.

Furthermore, the GW 2 according to the present embodiment detects abnormalities in information included in non-periodic messages. Thus, the GW 2 can deal with a spoofing attack involving a non-periodic message.

Furthermore, the GW 2 according to the present embodiment estimates normal information corresponding to information in a non-periodic message in which an abnormality has been detected, based on information included in a periodic message received prior to the non-periodic message in which an abnormality has been detected. Thus, the GW 2 can estimate normal information for a non-periodic message in accordance with the state of the vehicle 1, etc., that can be determined based on information in a periodic message.

Furthermore, the GW 2 according to the present embodiment relays messages between a plurality of ECUs 4. In doing so, if the GW 2 detects an abnormality in a message to be relayed, the GW 2 relays the message after subjecting the message to the above-described estimation and replacement. If the GW 2 replaces information, the GW 2 notifies a relay-destination ECU 4 of the fact that replacement has been performed by providing, to the message, flag information indicating that replacement has been performed. Thus, the relay-destination ECU 4 can determine, based on the flag information included in the message, whether or not information has been replaced, and can perform processing such as discarding if the replaced information is of low necessity, for example.

Note that, while a configuration is adopted in which the GW 2 relaying messages performs the processing for estimating and replacing information included in abnormal messages in the present embodiment, there is no limitation to this. For example, a configuration may be adopted in which each ECU 4 included in the in-vehicle communication system performs the processing for estimating and replacing information included in abnormal messages. In this case, each ECU 4 can estimate and replace information when an abnormal message is received and perform subsequent processing using the estimated information or the message subjected to replacement.

Furthermore, the network configuration of the in-vehicle communication system illustrated in FIG. 1 in the present embodiment is one example, and there is no limitation to this. Also, values such as the cycles, normal ranges, and normal increase/decrease amounts in the abnormality detection table 22b illustrated in FIG. 3 are examples, and there is no limitation to such examples. Furthermore, the estimation methods in the information estimation table 22c illustrated in FIG. 4 are examples, and there is no limitation to such examples.

Each device in the in-vehicle communication system includes a computer configured so as to include a microprocessor, a ROM, a RAM, etc. A computational processing unit such as the microprocessor may read computer programs including some or all of the steps in a sequence diagram or a flowchart such as those illustrated in FIGS. 6 and 7 from storage units such as the ROM and the RAM and execute the computer programs. The computer programs for the plurality of devices can each be installed from an external server device or the like. Furthermore, the computer programs for the plurality of devices are each distributed in a state in which the computer program is stored in a recording medium such as a CD-ROM, a DVD-ROM, a semiconductor memory, or the like.

The embodiment disclosed herein is an example in every way, and shall be construed as being non-limiting. The scope of the present disclosure is not limited to what is defined above, and is intended to include all modifications that are indicated by the claims and are within the meaning and scope of equivalents of the claims.

The invention claimed is:

1. An in-vehicle communication device installed in a vehicle, the in-vehicle communication device comprising:
a reception unit and a processing unit,
wherein the reception unit receives a plurality of messages from one or more other devices, and
the processing unit:
detects an abnormality in an information included in the plurality of messages received by the reception unit;
generates an estimated information that is estimated normal information corresponding to information in which the abnormality has been detected; and replaces the information included in the plurality of messages received by the reception unit with the estimated information;
determines whether the plurality of messages received by the reception unit are periodic messages or non-periodic messages, the periodic messages being messages of the plurality of messages that are periodically transmitted and the non-periodic messages being messages of the plurality of messages that are not periodically transmitted;
determines whether or not the periodic messages have been transmitted at a predetermined cycle; and
only detects abnormalities in information included in the periodic messages determined as having been transmitted at predetermined cycles.

2. The in-vehicle communication device according to claim 1, wherein the processing unit estimates normal information for the periodic messages in which the abnormality has been detected, based on a chronological change in the information included in the periodic messages received prior to a message of the plurality of periodic messages in which an abnormality has been detected.

3. The in-vehicle communication device according to claim 1, wherein the processing unit discards the periodic messages determined as not having been transmitted at predetermined cycles.

4. The in-vehicle communication device according to claim 1, wherein the processing unit detects the abnormalities in information included in the non-periodic messages.

5. The in-vehicle communication device according to claim 4, wherein the processing unit estimates the normal information for a non-periodic message of the non-periodic message in which an abnormality has been detected, based on information included in a periodic message received prior to the non-periodic message in which an abnormality has been detected.

6. The in-vehicle communication device according to claim 1, further comprising:
a transmission unit,
wherein the processing unit provides, to the message in which information has been replaced, flag information indicating that the replacement has been performed, and
the transmission unit transmits, to one or more other devices, the messages in which no abnormality in the information has been detected by the processing unit and the messages in which information has been replaced by the processing unit.

7. An information replacement method,
wherein an in-vehicle communication device installed in a vehicle:
- detects an abnormality in an information included in a plurality of messages received from one or more other devices;
- estimates a normal information corresponding to information in which the abnormality has been detected;
- replaces information included in received the plurality of messages with the estimated information;
- determines whether the plurality of messages received are periodic messages or non-periodic messages, the periodic messages being messages of the plurality of messages that are periodically transmitted and the non-periodic messages being messages of the plurality of messages that are not periodically transmitted;
- determines whether or not the periodic messages have been transmitted at a predetermined cycle; and
- only detects abnormalities in information included in the periodic messages determined as having been transmitted at predetermined cycles.

* * * * *